United States Patent [19]
Marchesi et al.

[11] Patent Number: 5,656,178
[45] Date of Patent: Aug. 12, 1997

[54] METHOD FOR TREATMENT OF CONTAMINATED MATERIALS WITH SUPERHEATED STEAM THERMAL DESORPTION AND RECYCLE

[75] Inventors: Primo Marchesi, Lock Haven; George M. Goyak, Murrysville, both of Pa.

[73] Assignee: American Color And Chemical Corp., Lock Haven, Pa.

[21] Appl. No.: 55,428

[22] Filed: Apr. 29, 1993

[51] Int. Cl.$^6$ ............................................ C02F 1/00
[52] U.S. Cl. ...................... 210/770; 210/774; 210/180; 34/410; 34/411; 34/412; 34/415; 34/417; 34/418
[58] Field of Search ........................... 210/791, 770, 210/771, 774, 180, 181, 167, 177, 188, 638, 605, 631, 908, 909; 110/215, 240, 204, 236; 34/410–412, 218, 415, 417, 418; 201/1; 502/34

[56] References Cited

U.S. PATENT DOCUMENTS

| | | | |
|---|---|---|---|
| 3,212,197 | 10/1965 | Crawford | 34/36 |
| 3,525,673 | 8/1970 | Cameron | 201/1 |
| 3,946,495 | 3/1976 | Osdor | 34/15 |
| 3,991,481 | 11/1976 | Coraor et al. | 34/73 |
| 4,217,222 | 8/1980 | Harendza-Harinxma | 210/181 |
| 4,340,471 | 7/1982 | Jordan | 210/180 |
| 4,422,940 | 12/1983 | Cousino et al. | 210/631 |
| 4,621,437 | 11/1986 | Grande et al. | 34/36 |
| 4,676,908 | 6/1987 | Ciepiela et al. | 210/638 |
| 4,725,337 | 2/1988 | Greene | 34/36 |
| 4,738,206 | 4/1988 | Noland | 110/346 |
| 4,974,528 | 12/1990 | Barcell | 110/240 |
| 5,005,495 | 4/1991 | Feitel | 110/204 |
| 5,052,313 | 10/1991 | Walker | 110/346 |
| 5,072,674 | 12/1991 | Noland et al. | 110/346 |
| 5,103,578 | 4/1992 | Rickard | . |
| 5,121,699 | 6/1992 | Frank | 110/246 |
| 5,142,998 | 9/1992 | Feitel | 110/215 |
| 5,152,233 | 10/1992 | Spisak | 110/240 |
| 5,187,131 | 2/1993 | Tiggelbeck et al. | 502/34 |

OTHER PUBLICATIONS

"In Situ Steam/Hot–Air Soil Stripping", Toxic Waste (USA) Inc., EPA Site Technology Evaluation Demonstration Bulletin, EPA/540/M5–90/003, Feb., 1990.

"Batch Steam Distillation and Metal Extraction" It Corporation EPA Site Technology Profile, pp. 224–225, Nov. 1991; EPA Vendor Information System for Innovative Treatment Technologies (VISITT), pp. 1–22, Sep. 27, 1991.

"Thermal Desorption by Steam Stripping/Solid Waste Desorption", Texarome Inc. EPA Site Technology Profile, pp. 152–153, Nov. 1991; EPA Visitt, pp. 1–14 Aug. 19, 1991; and Related Excerpt, pp. 1–3.

"Here'S How It Works" Clean Soil Steam Remediation Technology, Soils p. 42, May 1992.

*Primary Examiner*—Ana Fortuna
*Attorney, Agent, or Firm*—Ernestine C. Bartlett

[57] ABSTRACT

A method is provided for the treatment of contaminated materials such as impounded sludges and contaminated soils by thermal desorption wherein a solid matrix is subjected to the action of superheated steam in a closed vessel, a gas stream comprising superheated steam is recirculated to the vessel and recirculation of the superheated steam is continued until organic constituents are separated therefrom to predetermined concentrations that are environmentally insignificant and within the limits prescribed by governmental regulations.

16 Claims, 2 Drawing Sheets

METHOD FOR TREATMENT OF CONTAMINATED MATERIALS WITH SUPERHEATED STEAM THERMAL DESORPTION AND RECYCLE

FIELD OF THE INVENTION

This invention relates to a method for the treatment of contaminated materials such as, for example, impounded sludges, contaminated soils, and in general, solid waste materials, the method involving the steps of reducing the moisture content and organic component concentrations from such solid materials, via steam stripping and drying of the solids to a predetermined level to remediate or cleanup such contaminated materials to conform to environmental standards.

BACKGROUND OF THE INVENTION

Various environmental laws regulate the discharge or disposal of waste materials into natural streams, municipal sewers, land surfaces, or underground reservoirs since these materials usually contain hazardous or undesirable concentrations of contaminants. Generally, these environmental regulations prohibit the concentration levels of the contaminants from exceeding specific limits which have been determined to ensure a relatively safe environment. The disposal of materials that exceed these limits is a major problem of growing complexity particularly in view of ever increasing amounts of such materials for disposal and in view of stricter state and federal environmental regulations. There are many industrial and commercial sites in need of remediation either because of ongoing operations that generate hazardous waste materials that must be disposed of or because of accumulated waste materials that have not been processed to reduce the contaminants to meet the proscribed limits. The clean-up of contaminated industrial sites in particular has heretofore presented problems primarily because of the expense and time involved and the tremendous energy requirements that accompany the methods that have been available.

Conventional methods for the cleanup of contaminated sites include: (1) dewatering of sludges, treating the liquid phase, and land disposing the solid phase (filtercake); (2) vaulting in place using slurry walls and stabilization agents; (3) incineration; and (4) thermal desorption. Methods (1) and (2) can be eliminated if the material is covered by EPA Land Disposal Restrictions (LDR) which require that these LDR waste materials meet the applicable treatment standard before subsequent placement in or on the land. If LDR applies, incineration is usually the selected method of disposal. However, incineration is very unpopular with the public often creating additional environmental concerns. For example, incineration in the presence of water and oxygen may result in the formation of dioxins/furans which are known to be extremely toxic and in all likelihood are more hazardous than the initial contaminant that was incinerated. As a result, incineration permits for off-site processing are often either unavailable or very difficult to obtain. Moreover, even when such permits are obtained, on-site incineration may add up to 50% to 300% of additional expenses to the cleanup costs, due to large volumes of combustion gases that will require air handling and treatment equipment such as water quenchers, dust collectors, and water scrubbers. Moreover, the wastes (e.g.,ash) from the incineration process may require disposal in a secured land fill. Since incineration generally results in little volume reduction, disposal costs for the waste ash can be significant. Off-site incineration can add additional costs associated with packaging and transporting the waste materials to the incineration site. Off-site incineration can add up to 30% to 50% of additional costs to the on-site incineration costs. Additionally, off-site incineration can add months to the completion of the cleanup due to low incineration capacity nationwide. Both on-site and off-site incineration can result in residual wastes that are covered by RCRA, resulting in additional encapsulation costs for disposal of the residual wastes generated by the incineration.

The provision of a method for cleaning up sludges or contaminated soils or other contaminated solid waste materials that does not involve on-site or off-site incineration is an increasingly critical need in the art.

Thermal desorption is a physical separation process employed for the removal of organics from many types of solid materials such as soil, sludge, and filtercake, which is typically carried out using a direct fired rotary dryer followed by a baghouse, thermal oxidizer (afterburner or incinerator for gases), water quench to cool the gases, packed scrubber, and stack for emission of gases. Additionally, various systems have been proposed that use direct or indirect heat exchange to achieve bed temperatures of 200° to 1000° F. with oil or combustion gas as the transfer medium. Residence times typically depend on contaminant vapor pressures, soil conditions, operable variables, and applicable remediation criteria. Residual treatment requirements typically include those for oversized reject, offgases and water. Particulate control systems are also required. Offgas treatment typically includes both thermal oxidation (at temperatures above 1,600° F.) to burn the organics and scrubbing units to remove chemicals such as HCl. Such off-gas treatment is generally significant in terms of cost and meeting regulatory requirements. Although thermal desorption is a proven method for the removal of organics, regulatory agencies often require significant treatability testing and other measures (e.g., test burns) to ensure that there are no emissions problems and that the organics are not transformed into more toxic products as a result of the thermal desorption or offgas treatment processes.

None of the known thermal desorption treatment methods use superheated steam in a portable, optionally continuous, optionally countercurrent or concurrent flow, multi-stage process and system with closed loop superheated steam recycle as described and claimed hereinbelow.

A thermal desorption process that has been proposed is that described in the publication *Thermal Desorption by Steam Stripping/Solid Waste Desorption*, Texarome, Inc., EPA SITE Technology Profile, pp.152–153, November, 1991; EPA VISITT, pp.1–14, Aug. 19, 1991; and related excerpt, pp.1–3. The Texarome process is described as a portable, continuous, countercurrent flow, multi-stage process with interstage dispersion and separation of the phases and one in which soils conveying and collection systems are isolated by piping systems of a proprietary design and process equipment which is then surrounded by an enclosure and jacket. A portion of the stack gases from the steam generated is used in the surrounding jacket and is moved through the system by an induced draft fan. Superheated steam is used to convey solids through the processing system and process equipment such as cyclones and bag collectors are used to separate solids from the gaseous stream. All of the steam generated is first condensed and is then recycled as water. According to the publication, the process is effective to separate and recover organic volatiles, semivolatiles, and other organic compounds from soils. Such a process as described is also subject to several disadvantages: i.e. the required cyclones and bag collectors are known to handle tacky materials such as wet sludges with difficulty; the boiler stack gases used in a plenum can easily educt volatile organics and semivolatile organics into this gas stream because one side of the plenum is under lower pressure. This can result in a violation of the applicable regulations and shutdowns. Up to four additional units may be required to precondition the contaminated soils and the soils may require conditioning to a 20 mesh or smaller size which is a significant size reduction operation in itself. High energy crushers and screening systems are necessary to accomplish these size requirements and additional air handling and treating equipment is also required to handle the dust and the organic emissions from the crushing and screening steps. Approximately 5 to 30% of the soils can remain in the process system because of the small particle size of the soils, resulting in line plugging, significant capacity reduction, and shutdown. Additionally, recycling water instead of steam makes the process significantly more expensive in energy costs, less efficient and more time consuming in view of the need to first condense all generated vapors and then to revaporize the liquids for use in the process.

There is presently no known method available for the cleanup of contaminated materials, without incineration, that is portable and compact, multi-stage, optionally continuous, at least as cost effective as the non-incineration conventional methods mentioned above, significantly more cost effective than methods which involve incineration, and free of the disadvantages associated with known thermal desorption methods.

SUMMARY OF THE INVENTION

An object of this invention is the provision of a method and system for the treatment of contaminated solid materials such as soils, sludges and filtercake without incineration wherein the levels of prohibited materials or pollutants present in the treated materials are within the limits prescribed by state and federal environmental regulations for disposal in or on land, and wherein RCRA and CERCLA regulations for remediation are readily and efficiently met at a cost that is significantly cheaper than conventional methods.

Another object of the invention is to provide a cost effective method for the cleanup of contaminated sites to meet the limits prescribed by environmental regulations wherein contaminated soils or sludges are conditioned and fluidized, if desired, and dried and organic components are steam stripped and condensed, whereby the amount of both moisture and organic constituents contained in said sludges or soils are reduced, and the solid mass after cleanup is suitable for replacement into the site from which it originated all without the need for incineration.

Yet another object of the invention is to provide a system and method for thermal desorption of contaminated materials which system and method is portable and compact, is at least as cost effective as the known non-incineration methods, is significantly more cost effective than methods which involve incineration and known thermal desorption methods, and is free of the disadvantages of such thermal desorption methods mentioned above.

These and other objects will be apparent from the description of the invention which follows which when taken in connection with the drawings disclose embodiments of the invention.

According to the invention, there is provided a method for treatment of materials contaminated with environmentally significant amounts of organic pollutants or constituents, said method comprising the essential steps of subjecting contaminated solid material comprising a solid matrix to the action of superheated steam in a closed vessel under conditions whereby volatilizable components thereof are volatilized and separated from the solid matrix, and recycling and/or recirculating a gas stream comprising said superheated steam to the closed vessel and continuing said recirculation and contact until said solid matrix is dried and organic constituents are separated therefrom to predetermined concentrations that are environmentally insignificant and within the limits prescribed by governmental regulations.

As used herein, the term "pollutant" is meant to designate compounds that are present in quantities that exceed the limits of such compounds imposed by environmental laws and regulations.

This invention also relates to a novel, portable, continuous, optionally countercurrent flow, thermal desorption process and system which employs superheated steam to desorb contaminants from solid waste materials. The use of superheated steam, for example, is believed to reduce the partial pressure of organic pollutants permitting their removal or stripping at atmospheric pressure from contaminated solids at temperatures that are much lower than their normal boiling points without the necessity of operating under vacuum conditions. Superheated steam is readily available at low cost; behaves as an inert gas at the contemplated operating temperatures minimizing explosive conditions; permits the recovery of valuable resources, if desired; greatly reduces the potential formation of dioxins/furans; and most significantly, approaches a "zero discharge" of gas and liquid phases from the system.

This invention therefore additionally relates to an improved system and method for treatment of materials contaminated with environmentally significant amounts of organic pollutant compounds, said method comprising the essential steps of (1) providing apparatus means comprising a closed vessel, a superheater, and components adapted to associatively cooperate one with the other as a closed loop system; (2) contacting contaminated solid material comprising a solid matrix in said apparatus means with superheated steam for a period sufficient to vaporize water contained in said contaminated material and to convert the same to superheated steam; and (3) continuously recycling and recirculating superheated steam in said apparatus means comprising a closed loop system to continuously contact contaminated material until pollutants contained in said material have been volatilized to a predetermined amount of organic compounds, wherein:

the superheated steam is fed to contact the contaminated material from a source that is outside the closed loop system until a pre-selected temperature has been reached sufficient to vaporize water contained in said contaminated material and to convert the same to superheated steam and thereafter the apparatus means is operated as a closed loop system, the contacting with said superheated steam being effective to dry the solid matrix and to separate organic constituents that are volatilizable at the pre-selected temperature in the vessel.

In yet another preferred embodiment of the invention, contaminated earth solids are introduced into an enclosed treatment zone, which is maintained at an elevated temperature which promotes volatilization of volatilizable organic pollutants from the contaminated material; said solids are contacted with a stream of treatment gas consisting essentially of superheated steam, the treatment gas is withdrawn from the treatment zone, preferably at an exit pressure and at an exit temperature sufficient to maintain the gas stream in a superheated state; a major portion of the treatment gas is pressurized, reheated, and recirculated to the treatment zone as the treatment gas; a portion of the treatment gas withdrawn from the treatment zone is separated from the recirculating treatment gas and is cooled to condense the superheated steam and the volatilized organic pollutants. In this embodiment, the treatment gas comprising superheated steam and volatilized organic pollutants exit from the closed vessel at an exit pressure and an exit temperature and is delivered through conduit means to pump means where the pressure of the gas is increased above the exit pressure which may be atmospheric, sub-atmospheric or super-atmospheric and preferably from about 0 to 5 psig, while the exit temperature is sufficient to maintain the superheated steam in a superheated state at the exit pressure and is typically 220° F. to 500° F. Such a method for treating soils and apparatus therefor are described and claimed in copending U.S. patent application Ser. No. 055,433 entitled METHOD AND APPARATUS FOR SOIL REMEDIATION WITH SUPERHEATED STEAM THERMAL DESORPTION AND RECYCLE filed concurrently and commonly assigned herewith, the disclosure of which is incorporated herein by this reference.

The present method utilizes superheated steam in which, in preferred embodiments, the steam flows countercurrently through a bed of prepared material in a pressurized rotary drum which preferably contains lifting flights. The process uses available enthalpy to boil off entrained moisture, and then at higher temperatures, to volatilize and desorb the pollutants remaining in the material. A first portion of the resultant vapors are recycled through the system while a second minor portion is condensed and removed. There are no requirements for thermal oxidation or scrubber systems. Once the contaminants have been effectively isolated and removed from the condensed water, the water may be recirculated to wet the treated soil for dust control prior to placement on the site or it may be used as a source of boiler water makeup, if desired or necessary. Other constituents will typically condense into the liquid phase.

Superheated steam recycle and/or recirculation is an essential part of the method because it is accompanied by the advantages mentioned above and significantly reduces energy costs and makes the process and system more cost effective. Moreover, as is well known, the exact theory and mechanism of how liquids and vapors are released from solid matrices of inert materials such as soils and sludges is complex and unknown. For example, it has been postulated that factors such as the structure of the solids in a given inert material, the type of contaminant, the presence or absence of other contaminants in the inert material, the concentration of contaminants, and the saturation of the gas phase may all, simultaneously, influence the mechanism by which internal liquids flow through, and are volatilized from, a given inert material. (See U.S. Pat. No. 5,103,578 for a discussion of some of the complexities involved.) In the present case, the use of superheated steam is believed to reduce the partial pressure of organic pollutant components permitting their volatilization at atmospheric pressure from contaminated solids at temperatures that are much lower than their normal boiling points without the necessity of operating under vacuum conditions.

Specifically, a method is provided which comprises the steps of:

(1) optionally, subjecting the contaminated material to a conditioning treatment with or without fluidization;

(2) charging said material into a closed vessel which associatively cooperates with a superheater and other components of an apparatus to function as a closed loop system;

(3) feeding superheated steam through the closed vessel;

(4) feeding a portion of a gas stream comprising superheated steam exiting the closed vessel to a steam superheater that increases the temperature of the superheated steam and recycling the superheated steam to the closed vessel;

(5) discontinuing the superheated steam feed to the closed vessel after a pre-selected temperature is reached whereby steam is generated from the moisture contained in said contaminated material present in the closed vessel;

(6) removing vapor phases from said closed vessel;

(7) condensing said removed vapor phases;

(8) optionally, replacing said superheated steam in steps (3) and (4) above with nitrogen to cause evaporation of moisture entrained in the contaminated material to generate superheated steam where steam generators are either unavailable or undesirable;

(9) optionally, condensing a portion of the removed vapors; separating the condensed portion, and recycling the treated water phase; and recovering the organic constituents that are volatilizable at the pre-selected temperature in the vessel; and

(10) continuously subjecting contaminated material to the steps of drying and volatilizing until a product exhibiting satisfactory levels of constituents is obtained, the method being effective to provide a solid product that complies with specified governmental environmental standards in a high rate, efficient, comparatively low cost manner so as to promote waste management practices that provide for reclamation of contaminated sites and remediation of materials without further harm to environmental quality.

In a preferred embodiment of the invention, the method may be used for treating contaminated filtercake derived from sludge or soil according to a method and apparatus for cleanup of contaminated materials as described and claimed in copending U.S. application Ser. No. 055,432 entitled METHOD FOR TREATMENT OF IMPOUNDED SLUDGES, SOILS AND OTHER CONTAMINATED SOLID MATERIALS filed concurrently and commonly assigned herewith, now U.S. Pat. No. 5,453,202 issued Sep. 26, 1995, the disclosure of which is hereby incorporated by reference, the combined methods being particularly effective as a low temperature thermal desorption method for remediation of contaminated sites. According to such a method, water is added to sludge or other contaminated material, preferably at a ratio of 1 to 5 lbs. of water per pound of sludge to minimize foaming and to increase reaction efficiency, after which the mass is acidified by the addition of a suitable acid such as HCl. The acidified material is filtered to concentrate solids and to produce effluent which is passed through activated carbon. Solids from the clarifier are recycled for reacidification thereby causing solubilization of additional solids. The process is preferably continuous since the continuous reacidification of the recycled solids with acidification of additional sludges or soils reduces initial solids content and improves volatilization of VOCs and SVOCs. The amounts of water used for dilution may vary considerably depending on the particular waste material being treated. Similarly, the amount and concentration of the acid employed may vary depending on the nature of the waste product under consideration. Preferably, about 0.1 to 2.0 pounds of HCl for every pound of sludge on a dry solids basis is used.

The closed vessel utilized in the method may be of a construction well known in the art. Preferably, a pressurized rotary drum is employed. Operating conditions may vary depending on the boiling points of the organic components to be removed or volatilized. Steam temperatures ranging from super-heated steam at 250° F. to superheated steam at 1200° F. may be employed. The term "superheated steam" as used herein is meant to include steam which is maintained at a temperature above its saturation temperature with liquid water. Superheated steam may be introduced to flow through the reactor in either an upflow (countercurrent) or in a downflow (countercurrent) direction as required or dictated by process requirements.

The method of this invention is applicable to waste materials of various types including surface impoundment sludges; contaminated soils that can be excavated, optionally made into slurries, treated and redeposited in an excavation as fill. Other suitable materials include, for example, soils such as top soil, river sediments, bedrock, alluvium, and particulate fill materials such as cinders, gravel, slag, etc.; solid waste materials including solid materials contaminated with or originating from industrial chemicals and synthetics, specialty chemicals, steel, coke, and coal-tar chemicals; contaminated materials from the electronics industry; commercial waste such as that originating from dry cleaning, gasoline stations, and machine shops of various types; domestic waste from sewage treatment; etc.

The method and system of the invention has been found to have several inherent advantages: (A) the process is quite flexible with a wide variety of operating temperatures and residence times; (B) the process is a closed loop system with minimal potential for combustion or constituent oxygenation; (C) the process has no significant capital/operating cost requirements for offgas treatment; (D) waste is minimized since treatment-generated water is recycled; (E) the process is energy efficient since fuel consumption is controlled as a result of superheated steam recycle and moisture contained in the soil is utilized for superheated steam generation; and (F) the process is effective to remove a variety of contaminants including such organics as halogenated volatiles, halogenated semivolatiles, nonhalogenated volatiles, nonhalogenated semivolatiles, polychlorinated biphenyls (PCBs), pesticides, dioxins/furans, organic cyanides, organic corrosives, and inorganics such as volatile metals and the like.

DETAILED DESCRIPTION OF PREFERRED EMBODIMENTS

The following are specific examples in which the present invention has been demonstrated. Representative constituent concentrations (AVERAGE CONCENTRATIONS IN FILTER CAKE) and target constituent concentrations (TREATMENT STANDARDS) are illustrated in Table 1 which follows. These standards, established by the Pennsylvania Department of Environmental Resources (PADER), the California State Halogenated Organic Compound (HOC) List, and by the U.S. Environmental Protection Agency (EPA) including its Land Disposal (LDR) criteria, were used to establish acceptable guidelines by which to measure the effectiveness of the process of this invention. In Table 1, filtercakes 1B and 2 were derived from sludges from separate impoundments.

TABLE 1

CONSTITUENT TREATMENT STANDARDS AND CONCENTRATIONS

| PARAMETER | TREATMENT STANDARDS | | Average Concentrations In Filtercake | |
|---|---|---|---|---|
| | PADER (mg/kg) | EPA LAND BAN (mg/kg) | #1B (mg/kg) | #2 (mg/kg) |
| PADER INDIVIDUAL LIST: | | | | |
| ANILINE | 5.6 | 14 | | |
| BENZENE | 6.0 | 36 | | |
| 2-4 DINITROPHENOL | 5.6 | 160 | | |
| NITROBENZENE (1) | 5.6 | 14 | 495 | 144 |
| PHENOL | 5.6 | 6.2 | | |
| CALIFORNIA HOC LIST (2): | 1,000 | | | |
| CHLOROBENZENE | — | 5.7 | | |
| P-CHLOROANILINE | — | 16 | | |
| 1,2-DICHLOROBENZENE (1) | — | 6.2 | 4,091 | 3,720 |
| 1,3-DICHLOROBENZENE | — | 6.2 | | |
| 1,4-DICHLOROBENZENE | — | 6.2 | | |
| OTHERS: | | | | |
| CHLOROTOLUENE (1) | — | — | 2,762 | 819 |

NOTES:
(1) THREE TARGET CONSTITUENTS USED TO ASSESS EFFECTIVENESS OF SLUDGE/FILTER CAKE TREATMENT SYSTEM.
(2) THESE FIVE COMPOUNDS REPRESENT THE CALIFORNIA HOC LIST CONSTITUENTS THAT ARE PRESENT IN HIGH CONCENTRATIONS IN THE SLUDGE/FILTER CAKE.

Figure 1:
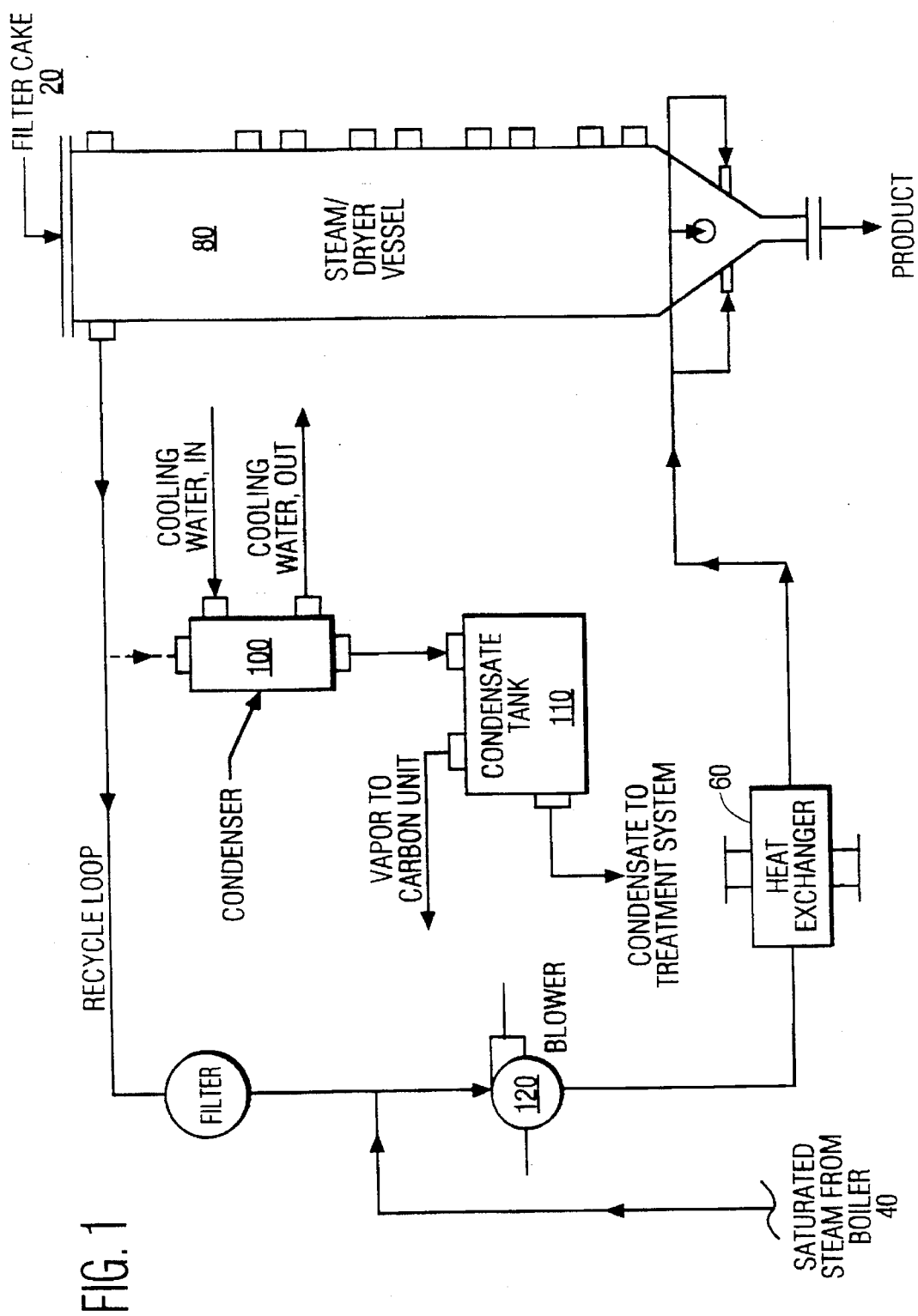
FIG. 1 is a schematic diagram illustrating one embodiment of the invention.

Referring to FIG. 1, several pilot plant scale tests were run. The pilot test system comprised a boiler 40 to produce steam; a thermal heater 60 to produce superheated steam initially or during recycle; a closed vessel 80 into which the filtercake 20 (derived from a semi-solid contaminated sludge formed by processing including the neutralization of spent sulfuric acid with lime and having the characteristics detailed in Table 1 hereinabove) was placed for contact with the superheated steam; a condenser 100 to condense the resultant vapors and/or volatilizations; and a blower 120 to provide the motive force for steam movement and recycle. It is also possible to bypass the blower and convey the steam into the heat exchanger 60 and then to the closed vessel 80.

Several tests were run while modifying operational variables. These variables, including initial and final moisture content, and the analytical results relating to removal of the three target constituents are listed in Tables 2 and 3. Eight of the nine tests were found to meet PADER requirements for nitrobenzene; all of the test results were within the standard limits for the California State Halogenated Organic Compound List (assuming 1,2-dichlorobenzene to be the most dominant constituent).

TABLE 2

PILOT SCALE TEST PROGRAM

VARIABLES

| TEST NO. | INITIAL PERCENT MOISTURE (%) | PEAK STREAM TEMPERATURE (°F.) | PEAK CAKE TEMPERATURE (°F.) | DURATION TOTAL TEST (MIN) | DURATION CAKE >218° F. (MIN) | TWO-HOUR AERATION (1) | FINAL PERCENT MOISTURE (%) |
|---|---|---|---|---|---|---|---|
| 1 | 63 | 367 | 325 | 510 | 225 | YES | 3.2 |
| 2 | 63 | 343 | 330 | 160 | 100 | YES | 4.1 |
| 3 | 63 | 343 | 335 | 200 | 195 | YES | 2.1 |
| 4 | 63 | 348 | 320 | 120 | 90 | YES | 21 |
| 5 | 63 | 344 | 333 | 255 | 255 | YES | 9.4 |
| 6 | 63 | 344 | 325 | 210 | 180 | YES | 0.4 |
| 7 | 63 | 344 | 293 | 270 | 210 | YES | 5.2 |
| 8 | 63 | 341 | 298 | 170 | 170 | YES | 1.9 |
| 9 | 63 | 345 | 300 | 210 | 210 | YES | 23 |

NOTE:
(1) AERATION INDICATES LETTING THE SAMPLE SIT OUT EXPOSED TO AIR

TABLE 3

SUMMARY PILOT SCALE TEST PROGRAM ANALYSES

| TEST NO. | PERCENT MOISTURE | 1,2-DICHLOROBENZENE CONCENTRATION (mg/kg) | CHLOROTOLUENE CONCENTRATION (mg/kg) | NITROBENZENE CONCENTRATION (mg/kg) | CAKE TEMPERATURE |
|---|---|---|---|---|---|
| 1 | 3.2 | 30 | 11 | 4.6 | +300° F. FOR ½ HOUR |
| 2 | 4.1 | 9.4 | 2.8 | 3.9 | +300° F. FOR 1 HOUR |
| 3 | 2.1 | 4.1 | 2.6 | 0.67 | +300° F. FOR 1 HOUR |
| 4 | 21 | 3.6 | 2.1 | 6.3 | +300° F. FOR 1 HOUR |
| 5 | 9.4 | 34 | 12 | 4.3 | +300° F. FOR 2 HOURS |
| 6 | 0.4 | 0.9 | 0.6 | 0.67 | +300° F. FOR 2 HOURS |
| 7 | 5.2 | 24 | 4.1 | 4.8 | +275° F. FOR 2 HOURS |
| 8 | 1.9 | 3.6 | 0.62 | 1.6 | +275° F. FOR 2 HOURS |
| 9 | 23 | 48 | 13 | 4.1 | +275° F. FOR 2 HOURS |

The above tests illustrate that consistent results for moisture content and pollutant concentration reduction can be achieved employing the method of this invention. The tests also indicate that the optimum temperature and duration are 275° F. and 2 hours, respectively for the materials tested.

To illustrate the versatility of the present process, the process of the invention was used to remediate contaminated soil and the above examples were substantially repeated using contaminated soil from a different site to determine effectiveness of the process with contaminated soil materials containing pesticides.

In these bench-scale tests, two boilers having a total capacity of 12.2 liters were employed with an in-line superheater designed to generate a maximum of 20 lbs. steam per hour steam at 1000° F. having an associated temperature controller, heating contactor and high limit controller were incorporated; during Test 1 additional measures were needed to minimize heat loss, i.e., a vertically disposed, jacketed steel closed vessel with an vacuum annular space was used; and during subsequent tests a 1 Torr vacuum was applied; a high temperature blanket insulation and electric heating means were installed and used to preheat the closed vessel shell prior to introducing superheated steam; pressure regulating bleedoff valves previously utilized were replaced with a manual ball valve to improve control of the soil bed temperatures, steam flow, and overall system operation. As a result, steam bleedoff to the condenser could readily be throttled back during heatup, and after closed-loop operating conditions had been reached, the ball valve could be fully opened to maintain operating pressure at about 3.5 psig. To effectively monitor system performance, thermocouple ports were installed to measure temperatures of the soil bed in the closed vessel, the incoming steam, exit steam, and recycle steam.

Five test runs were conducted. Test 1 was a preliminary test performed to check the performance of the reconfigured system. The next four tests were conducted at holding times of 30 minutes each. Target holding temperatures were 700°, 600°, 500°, and 700° F., respectively. Samples were analyzed by an EPA-certified laboratory according to EPA test method 608/SW846 8080 for pesticides. The results were as reported in Tables 4 and 5.

TABLE 4

| PESTICIDE TEST CONDITIONS | | | | | |
|---|---|---|---|---|---|
| CHARACTERISTIC | TEST 1[1] | TEST 2 | TEST 3 | TEST 4 | TEST 5 |
| TARGET HOLDING TEMP. (°F.) | — | 700 | 600 | 700 | 500 |
| TEST DATE | 10/1/92 | 10/2/92 | 10/5/92 | 10/6/92 | 10/8/92 |
| INITIAL CONDITIONS (2) | | | | | |
| SOIL MASS (g) | 926.4 | 922.2 | 927.7 | 925.0 | 923.0 |
| SOIL TEMP. (°F.) | — | 220 | 335 | 218 | 218 |
| INFLOW TEMP. (°F.) | 226 | 390 | 636 | 569 | 559 |
| REACTOR TEMP. (°F.) | 167 | 215 | 246 | 219 | 224 |
| REACTOR PRESSURE (psig) | 1.5 | 1.5 | 3.2 | 2.5 | 2.5 |
| SOIL TEMP. RAMPING PERIOD | | | | | |
| DURATION (min) | 72 | 62 | 27 | 37 | 17 |
| CONDENSATE VOLUME (ml) | 3800 | 2400 | 700 | 1450 | 750 |
| HOLDING PERIOD | | | | | |
| DURATION (min) | 60 | 30 | 30 | 30 | 30 |
| INFLOW TEMP. RANGE (°F.) | 880–885 | 716–824 | 635–826 | 744–891 | 558–613 |
| SOIL TEMP. RANGE (°F.) | — | 695–720 | 567–623 | 677–709 | 497–510 |
| REACTOR PRESSURE RANGE (psig) | 0.5–3.5 | 2.5–7.0 | 6.5–10.0 | 1.5–4.5 | 2.0–6.0 |
| FINAL CONDITIONS | | | | | |
| SOIL MASS (g) | 736.7 | 754.5 | 767.5 | 762.2 | 752.7 |
| TOTAL CONDENSATE VOLUME (ml) | 6750 | 3100 | 1340 | 2350 | 1800 |
| CONDENSATE pH (units)[2] | 3.85 | 3.58 | 3.91 | 3.58 | 4.10 |

[1]Test 1 performed for equipment checkout; laboratory analyses not performed.
[2]Initial boiler water pH typically 6.5 units.

TABLE 5

| PESTICIDE TEST RESULTS[1] | | | | | |
|---|---|---|---|---|---|
| PARAMETER (ug/kg) | UNTREATED | TEST 2 | TEST 3 | TEST 4 | TEST 5 |
| TARGET HOLDING TEMP. (°F.) | — | 700 | 600 | 700 | 500 |
| MOISTURE (%) | 7.6[2] | 0.0 | 0.0 | 0.0 | 0.0 |
| alpha-BHC | 1,600 | 0.89 J[3] | 2.6 | 1.0 J | 17 |
| beta-BHC | 2,700 | 4.1 | <1.7 | 3.0 | 35 |
| delta-BHC | 1,600 | 2.1 | 6.8 | 1.7 | <17 |
| Lindane | 410 J | <1.7 | <1.7 | 17 | <170 |
| 4,4-DDD | <1,800 | 15 | 36 | 9.2 | <33 |
| 4,4-DDT | 120,000 | 39 | 100 | 21 | 15 J |
| 4,4-DDE | 5,700 | 8.7 | 130 | 20 | 2,400 |
| Endosulfan I | 3,300 | 1.7 | 13 | 4.1 | 260 |
| Endosulfan II | 4,000 | 2.4 J | 7.6 | 1.4 J | 54 |
| Endrin | 2,000 | <3.4 | <3.4 | <3.4 | <33 |
| Toxaphene | 230,000 | <34 | <34 | <34 | <330 |
| TOTAL OCL PESTICIDE CONC. REDUCTION (%) | | >99.97 | >99.91 | >99.97 | >99.10 |

[1]All results reported on a dry-weight basis; only detectable OCL pesticides shown.
[2]Moisture content reported by test laboratory, treatability lab analyses averaged 11.6%.
[3]J indicates estimated value.

All of the tests met the objectives that illustrated the effectiveness of the invention. The treated samples were not discolored, nor did they exhibit a characteristic pesticide odor. The collected condensate was discolored and had an odor; it also exhibited a ph of typically less than 4.0 units compared to a boiler feed of 6.5 units indicating dechlorination. Concentration reduction of target compounds DDT and Toxaphene was greater than 99.9% for all test runs. Treatment to levels below LDRs for these two compounds was consistently met except for Test 3, which showed a DDT concentration that was slightly above the LDR limit of 87 ug/kg. Percent reductions of the total OCL (organochlorine) compound list ranged from greater than 99.1% for Test 5 at a 500° F. target temperature to greater than 99.9% for the other three tests. Final moisture content values were less than 1%.

It will be seen from the examples tabulated in the Tables that the method and system are applicable to the cleanup of a variety of contaminants and are a viable alternative for on-site treatment of soils from various contaminated sites.

The effect of operational variables were found to be minimal. However, due to fine particulate matter carryover from the closed vessel into other system components, it is preferred that a filtering means be placed immediately downstream of the closed vessel.

Figure 2:
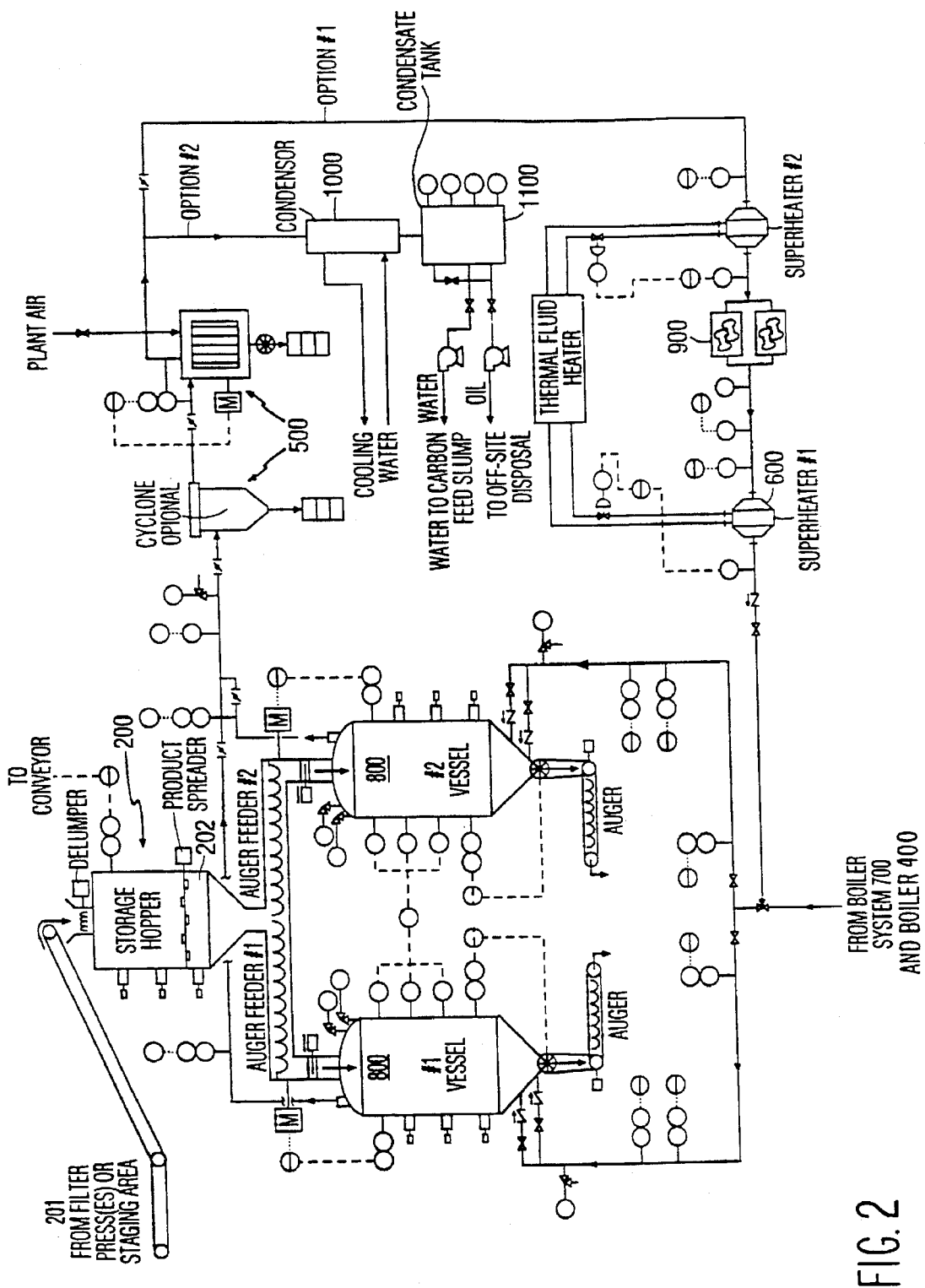
FIG. 2 is a schematic diagram illustrating another embodiment of the invention.

With reference to FIG. 2, there is illustrated a system effective to treat commercial quantities of contaminated solids material. The system comprises a contaminated materials feed system 200, closed vessels 800, boiler product removal system 700, (not shown) a boiler 400 (not shown), a fine particle removal system 500, a steam condenser 1000, and. Condensate collection system 1100, a superheater 600 and air compressor 900, and various instrumentation and control means (not shown).

The contaminated material (filter cake, soil, etc.) 20 is fed directly from the filter presses or staging area 201 into a storage hopper 202. From the hopper, the contaminated material is augered into two closed vessels 800 which are preferably vertically disposed when used to treat filtercake and horizontally disposed when used to treat soils. The feed augers are controlled independently by level indicators in each of the closed vessels. After contact with superheated steam, a set volume of treated filter cake will be emptied from the vessel bottom when the temperature indicator reads above a set temperature (e.g., 275° F.) for a certain length of time (e.g., 2 hours). A gas stream comprising superheated steam and volatilized organic constituents will flow out of the closed vessels into a cyclone, if desired, and also, if desired, into a bag filter for solids removal. A major portion of the existing gas stream comprising superheated steam is then recycled to the compressor 900, with a minor portion of the circulating stream comprising superheated steam and volatilized organic constituents passing through a condenser 1000 and collected as a condensate.

The system may be operated with complete superheated steam recycle, 0% boiler steam, (option 1 in FIG. 2) or with a selected % of boiler steam (option 2 in FIG. 2). The system may also be operated substituting nitrogen or other inert gas for the superheated steam or a portion thereof. As indicated above, in those instances where it is not practical to incorporate a boiler into the system, it is possible to operate the system nonetheless by feeding nitrogen to the system through the superheater to generate superheated steam from the moisture present in the soil or other contaminated material and thereafter, recycling and/or recirculating superheated steam derived from the soil, and/or nitrogen as desired.

It is imperative that the respective essential steps and the required procedure embodying those steps be carried out in the proper sequence. Therefore, when required, the fluidization and conditioning must be carried out before acidification, and solids must be recycled to the conditioning tank and/or closed vessel for reacidification and admixture with untreated sludge material when combining the method of this invention with the method for treatment of sludge to provide a suitable filtercake as described above.

The physical requirements of the apparatus can be varied considerably. The structure involved can be adopted to any required capacity and the components can be modified as desired.

The above tests were performed to demonstrate the effectiveness of the invention in reducing constituent concentrations to below currently established RCRA Land Disposal Restriction limits.

To illustrate the cost effectiveness of the present invention, four examples are provided for comparison in which the energy requirements for decontamination of soils by treatment with superheated steam is calculated for a process according to the invention, in which superheated steam is recycled, and according to a process in which superheated steam is employed without recycling. In all instances, the calculations are based on the following: (a) the contaminated soil contains 1% by weight of volatilizable organic pollutants and 20% by weight moisture at ambient temperature, (60° F.); (b) the decontaminated soil contains less than 0.5 wt percent water and less than 0.001 wt percent of residual organic pollutant, i.e., more than 99.9 wt percent of the volatilizable organic pollutants were removed; (c) the closed vessel is a rotary drum 5 feet in diameter, weight 7000 lbs. and the soil heated to 700° F.

Four examples will highlight the benefits resulting from the practice of the present invention.

In each example, calculations are made based on the system of FIG. 1 of said copending application Ser. No. 055,433 with certain changes to be described.

EXAMPLES I, II and III illustrate the cost effectiveness of the invention. EXAMPLE IV is a comparative example which illustrates the cost of using superheated steam without recycle or recirculation of superheated steam.

In EXAMPLE I, calculations were based on the system operated on 1 ton per hour of contaminated soil with superheated steam being employed to supply the entire heat requirements of the system.

In EXAMPLE II, calculations were based on the system operated on 1 ton per hour of contaminated soil with indirect heat supplied to the rotary drum and superheated steam being employed to heat the soil and to maintain the contaminated soil at the desired temperature, 700° F., and to offset heat losses from the system to the environment.

In EXAMPLE III, the calculations were based on system similar to that described in EXAMPLE II except that the throughput is 2 tons per hour.

In EXAMPLE IV, the calculations were based on the same system referred to in EXAMPLE I, without a pump, i.e. such a system which has no recirculating superheated steam and in which superheated steam provides all of the heat energy, is employed on a once-through basis, and the throughput is one ton per hour.

TABLE 6 sets forth the parameters of each EXAMPLE and the heat requirements and steam requirements.

TABLE 6

ENERGY REQUIREMENTS FOR SOIL DECONTAMINATION

| | EXAMPLES | | | |
|---|---|---|---|---|
| | I | II | III | IV (comparative) |
| FEED SOIL | | | | |
| Water, wt % * | 20 | 20 | 20 | 20 |
| Organics, wt % * | 1 | 1 | 1 | 1 |
| Temperature (°F.) | 60 | 60 | 60 | 60 |
| FLOW RATE lbs/hr | 2000 | 2000 | 4000 | 2000 |
| * - Wet Basis | | | | |
| PRODUCT SOIL | | | | |
| Water, wt % ** | <0.5 | <0.5 | <0.5 | <0.5 |
| Organics, wt % ** | <0.001 | <0.001 | <0.001 | <0.001 |
| Exit Temperature (°F.) ** - Dry Basis | 700 | 700 | 700 | 700 |
| HEAT REQUIREMENTS (75% Efficiency), MBTU/hr | | | | |
| Heat Soil to 700 (°F.) | 520 | 520 | 1040 | 520 |
| Heat, Vaporize Moisture | 665 | 665 | 1330 | 665 |
| Heat, | 15 | 15 | 30 | 15 |

TABLE 6-continued

ENERGY REQUIREMENTS FOR SOIL DECONTAMINATION

| | EXAMPLES | | | |
|---|---|---|---|---|
| | I | II | III | IV (comparative) |
| Vaporize Organics | | | | |
| Heat Loss | 300 | 300 | 300 | 300 |
| TOTAL HEAT REQUIREMENTS | 1500 | 1500 | 2700 | 1500 |
| STEAM REQUIREMENTS | | | | |
| S/H Steam lbs/hr | 3925 | 2250 | 2250 | 3925 |
| S/H Steam to Compressor 220 (°F.) - ACFM | 1770 | 1015 | 1015 | N/A |
| S/H Steam to Superheater 300 (°F.) - ACFM | 1310 | 750 | 750 | N/A |
| S/H Steam to Rotary Drum 1000 (°F.) - ACFM | 2820 | 1600 | 1600 | 3925 |
| INDIRECT HEAT - MBTU/hr | 0 | 635 | 1835 | 0 |

From TABLE 6 it will be observed that the steam requirements for EXAMPLE I is the same as that for EXAMPLE IV. In both EXAMPLES I and IV all of the heat requirement is supplied by superheated steam. Similarly, the superheated steam requirement for EXAMPLE II is the same as that of EXAMPLE III, despite the fact that EXAMPLE III treats twice the quantity of contaminated soil of EXAMPLE II.

TABLE 7 sets forth the cooling requirements for volatilized organic pollutants and the carrying steam and also a summary of the overall energy requirements.

TABLE 7

| | EXAMPLES | | | |
|---|---|---|---|---|
| | I | II | III | IV (comparative) |
| GAS EXIT STREAM (lbs/hr) | | | | |
| Steam | 3925 | 2250 | 2250 | 3925 |
| Soil Moisture | 390 | 390 | 780 | 390 |
| Organics | 20 | 20 | 40 | 20 |
| GAS STREAM TO CONDENSER (lbs/hr) | | | | |
| Vaporized Moisture | >390 | >390 | >780 | >390 |
| Organics | 20 | 20 | 40 | 20 |
| Recirculating S/H Steam | 0 | 0 | 0 | 3925 |
| TOTAL LBS/HR TO CONDENSER | >410 | >410 | >820 | >4335 |
| COOLING REQUIREMENTS to 60 (°F.), 75% Efficiency MBTU/hr | 617 | 617 | 1234 | 5000 |
| ENERGY REQUIREMENTS (MBTU/ton) | | | | |
| S/H Steam | 1500 | 865 | 433 | 5300 |
| Cooling | 620 | 620 | 620 | 5120 |
| Indirect Heat To Rotary Drum | 0 | 635 | 917 | 0 |
| TOTAL ENERGY REQUIREMENTS MBTU/Ton | 2120 | 2120 | 1970 | 10420 |

In TABLE 7 the cooling requirements per ton of soil processed are identical for EXAMPLE I, EXAMPLE II and EXAMPLE III.

The cooling requirements for EXAMPLE IV are disproportionate because the superheated steam is employed on a once-through basis.

Summary of Examples I to IV

From TABLE 7 it will be observed that a substantial savings in the total energy requirements per ton for the described soil decontamination are obtained according to the invention (compare Examples I, II and III with example IV). It will also be observed that the total energy requirements per ton are least for EXAMPLE III since the same rotary drum is processing twice the throughput with the same heat loss. The energy requirements for the method illustrated by EXAMPLE IV (without recirculation or recycle of superheated steam) are excessive.

Some of the energy supplied for EXAMPLES II and III is in the form of burning fuel gas or fuel oil which provides thermal energy at relatively low cost and at a significantly lower cost than electrically heated superheated steam. By significantly reducing the amount of superheated steam required to be in the recirculating loop (compare EXAMPLES II, III versus EXAMPLES I, IV) it is apparent that the size of the superheater and pump may be meaningfully reduced when a supplemental heating means supplies a substantial portion of the heat requirements of the overall system.

The invention may be embodied in other specific forms without departing from the spirit and scope or essential characteristics thereof, the present disclosed examples being only preferred embodiments thereof.

What is claimed is:

1. A method for treatment of soil materials contaminated with at least one volatilizable or semi-volatilizable organic pollutant, said method being conducted without an incineration step and consisting essentially of the steps of subjecting contaminated material comprising a solid matrix to the action of superheated steam in a closed vessel under conditions whereby pollutants contained in the solid matrix are volatilized, and recycling and/or recirculating said superheated steam to the closed vessel and continuing said recycle and/or recirculation of superheated steam and contact thereof with the solid matrix until said solid matrix is dried and organic pollutants are volatilized therefrom to yield a treated solid material the volatile and semi-volatile organic pollutant content of which is not greater than predetermined concentrations and which is substantially less than that of the contaminated soil.

2. An improved method for treatment of soil materials contaminated with environmentally significant amounts of volatilizable and semi-volatilizable organic pollutants, said method being conducted without an incineration step and consisting essentially of the steps of (1) providing apparatus means comprising a closed vessel, at least one superheater, and components adapted to associatively cooperate one with the other as a closed loop system having a recycle direction and a feed direction;

(2) contacting contaminated soil material comprising a solid matrix in said apparatus means with superheated steam for a period sufficient to vaporize water contained in said contaminated material and to convert the same to superheated steam; and (3) continuously recycling and/or recirculating superheated steam in said apparatus means to continuously contact contaminated material until organic pollutants contained in said contaminated material have been volatilized and removed to yield a treated solid material containing no more than a predetermined amount of said organic pollutants that is substantially less than the amount present in said contaminated soil.

3. A method as claimed in claim 2 wherein the superheated steam is fed to contact the contaminated material from a source that is outside the closed loop system until a pre-selected temperature has been reached sufficient to vaporize water contained in the contaminated material and to convert the vaporized Water to superheated steam and thereafter the apparatus means is operated as a closed loop system.

4. A method as claimed in claim 2, wherein the contaminated solid material is a filter cake that has resulted from the steps of fluidization and acidification of a solid waste product in a reactor, and filtration to yield a first solids product; recycling of the first solids product and admixture of the recycled first solids product with additional contaminated solid material, and continuously subjecting a mixture of first solids product and contaminated solid material to fluidization, acidification, filtration, recycling and admixture until a filter cake exhibiting predetermined characteristics is produced.

5. A method as claimed in claim 4, wherein said filter cake is subjected to treatment by a method which comprises the steps of:
(a) conditioning said filter cake by subjecting the said filtercake to a size reduction operation for material uniformity and increased surface areas;
(b) charging the conditioned filter cake into a solid steam drying and stripping closed vessel;
(c) contacting the filter cake in the closed vessel with a gas stream comprising superheated steam;
(d) recycling said gas stream comprising superheated steam from the closed vessel through a steam superheater back to the closed vessel;
(e) continuing to recycle and/or recirculate said superheated steam to said closed vessel to contact said filter cake until a preselected temperature is reached whereby steam is generated from the moisture contained in the filter cake that was charged to the closed vessel and the apparatus operates as a closed loop system.

6. A method as claimed in claim 5 wherein the conditioned filter cake is treated to scrub gas-borne particulates from the exiting gas stream.

7. A method as claimed in claim 2, wherein the apparatus means includes a positive displacement blower that supplies a motive force for recycling and recirculating the superheated steam, said blower being located between said at least one superheater and the closed vessel in said recycle direction.

8. A method as claimed in claim 2, wherein said soil material is subjected to treatment by a method which comprises the steps of:
(a) feeding the soil material into a solids steam drying and stripping closed vessel;
(b) contacting the soil material in the closed vessel with a gas stream mixed with said superheated steam;
d) recycling said gas stream comprising superheated steam from the closed vessel through a steam superheater back to the closed vessel;
(e) continuing to recirculate said superheated steam to said closed vessel to contact said soil material until a preselected temperature is reached whereby steam is generated from the moisture contained in the soil material that was fed to the closed vessel and the apparatus operates as a closed loop system.

9. A method as claimed in claim 8, wherein the apparatus means includes a positive displacement blower that supplies a motive force for recycling the superheated steam, said blower being located between the at least one superheater and the closed vessel in said recycle direction.

10. A method for treatment of soil materials contaminated with volatilizable and semi-volatilizable organic pollutants, which consists essentially of the steps of:
(1) charging contaminated soil material into an apparatus system comprising a closed vessel which operatively cooperates with a superheater and apparatus components as a closed loop system;
(2) feeding superheated steam through the closed vessel;
(3) feeding superheated steam exiting the closed vessel to a steam superheater that increases the temperature of the steam and recycling the superheated steam to the closed vessel;
(4) discontinuing the superheated steam feed to the closed vessel after a preselected temperature is reached whereby steam is generated from the moisture contained in said contaminated material present in the closed vessel and said apparatus system operates as a closed loop system;
(5) removing vapor phases from said closed vessel;
(6) condensing said removed vapor phases; and
(7) continuously subjecting contaminated material to the steps of drying and volatilizing to yield a treated solid material the organic pollutant content of which is not greater than predetermined concentrations and is less than that amount present in said contaminated soil.

11. A method as claimed in claim 10 wherein the contaminated soil material is a filter cake that has resulted from the steps of fluidization and acidification of a solid waste product in a reactor, and filtration to yield a first solids product; recycling of the first solids product and admixture of the recycled first solids product with additional solid contaminated material, and continuously subjecting a mixture of first solids product and solid contaminated material to fluidization, acidification, filtration, recycling and admixture until a filter cake exhibiting predetermined characteristics is produced.

12. A method as claimed in claim 11 wherein said solid material comprises a semi-soil sludge formed by the neutralization with lime of a sulfuric acid effluent contaminated with environmentally significant amounts of organic solvents and by-products resulting from the production of synthetic dyes and related intermediate chemicals, and associated waste water.

13. A method as claimed in claim 10 wherein the contaminated material is a soil material.

14. A method for treatment of impounded sludges or soil materials contaminated with volatilizable and semi-volatilizable organic pollutants, which method is conducted without an incineration step and which consists essentially of the steps of:
(1) subjecting contaminated impounded sludge or soil material to a conditioning treatment with fluidization;
(2) charging said material into an apparatus system comprising a closed vessel which operatively cooperates with a superheater and apparatus components as a closed loop system;
(3) feeding superheated steam through the closed vessel;
(4) feeding superheated steam exiting the closed vessel to a steam superheater that increases the temperature of the steam and recycling the superheated steam to the closed vessel;
(5) discontinuing the superheated steam feed to the closed vessel after a preselected temperature is reached whereby steam is generated from the moisture contained in said contaminated material present in the closed vessel and said apparatus system operates as a closed loop system;

(6) removing vapor phases from said closed vessel;

(7) condensing said removed vapor phases; and (8) continuously subjecting contaminated material to the steps of drying and volatilizing to yield a treated solid material the organic pollutant content of which is not greater than predetermined concentrations and is less than that amount present in said contaminated soil or impounded sludge.

15. A method for treatment of impounded sludges or soil materials contaminated with volatile and semi-volatile organic pollutants which consists essentially of the steps of:

(1) subjecting contaminated solid material to a conditioning treatment;

(2) charging said material into an apparatus system comprising a closed vessel which operatively cooperates with a superheater and apparatus components as a closed loop system;

(3) feeding superheated steam through the closed vessel;

(4) feeding superheated steam exiting the closed vessel to a steam superheater that increases the temperature of the steam and recycling the superheated steam to the closed vessel;

(5) discontinuing the superheated steam feed to the closed vessel after a preselected temperature is reached whereby steam is generated from the moisture contained in said contaminated material present in the closed vessel and said apparatus system operates as a closed loop system;

(6) removing vapor phases from said closed vessel;

(7) condensing said removed vapor phases; and (8) continuously subjecting contaminated material to the steps of drying and volatilizing to yield a treated solid material the organic pollutant content of which is not greater than predetermined concentrations and is less than that amount present in said contaminated soil or impounded sludge.

16. A method for treatment of impounded sludges or soil materials contaminated with volatile and semi-volatile organic pollutants which consists essentially of the steps of:

(1) subjecting contaminated solid material to a conditioning treatment with fluidization;

(2) charging said material into an apparatus system comprising a closed vessel which operatively cooperates with a superheater and apparatus components as a closed loop system;

(3) feeding nitrogen gas through the superheater to the closed vessel to contact contaminated material contained therein and convert moisture present in said contaminated material to steam which exits the closed vessel;

(4) feeding a gas stream comprising steam exiting the closed vessel to a steam superheater that increases the temperature of the steam and recycling the superheated gas stream comprising steam to the closed vessel;

(5) discontinuing the superheated gas stream feed to the closed vessel after a preselected temperature is reached whereby steam is generated from the moisture contained in said contaminated material present in the closed vessel and said apparatus system operates as a closed loop system;

(6) removing vapor phases from said closed vessel;

(7) condensing said removed vapor phases; and (8) continuously subjecting contaminated material to the steps of drying and volatilizing to yield a treated solid material the organic pollutant content of which is not greater than predetermined concentrations and is less than that amount present in said contaminated soil or impounded sludge.

* * * * *